US010241523B2

(12) United States Patent
Hielkema et al.

(10) Patent No.: US 10,241,523 B2
(45) Date of Patent: Mar. 26, 2019

(54) DIFFERENTIAL PRESSURE REGULATING SHUT-OFF VALVE

(71) Applicant: GE Aviation Systems, LLC, Grand Rapids, MI (US)

(72) Inventors: Jerry Dean Hielkema, Loves Park, IL (US); Kevin Hallisey, Naples, FL (US)

(73) Assignee: GE Aviation Systems, LLC, Grand Rapids, MI (US)

( * ) Notice: Subject to any disclaimer, the term of this patent is extended or adjusted under 35 U.S.C. 154(b) by 150 days.

(21) Appl. No.: 15/209,273

(22) Filed: Jul. 13, 2016

(65) Prior Publication Data

US 2018/0017977 A1 Jan. 18, 2018

(51) Int. Cl.
| | |
|---|---|
| *G05D 16/16* | (2006.01) |
| *F16K 1/18* | (2006.01) |
| *F16K 31/122* | (2006.01) |
| *G05D 16/20* | (2006.01) |

(52) U.S. Cl.
CPC ............ *G05D 16/166* (2013.01); *F16K 1/18* (2013.01); *F16K 31/1221* (2013.01); *F16K 31/1223* (2013.01); *F16K 31/1225* (2013.01); *G05D 16/2093* (2013.01)

(58) Field of Classification Search
CPC ......... Y10T 137/7791; Y10T 137/7758; Y10T 137/7762; G05D 16/166; G05D 16/2093; F16K 31/1221; F16K 31/1223; F16K 31/1225; F16K 1/08
See application file for complete search history.

(56) References Cited

U.S. PATENT DOCUMENTS

| | | | | |
|---|---|---|---|---|
| 1,623,444 A | * | 4/1927 | Sjoo ....................... | G05D 16/10 137/488 |
| 1,756,824 A | * | 4/1930 | Hasemann ......... | G05D 16/2093 137/102 |
| 4,477,051 A | * | 10/1984 | Ben-Yehuda ......... | F16K 31/402 251/298 |
| 8,172,202 B2 | | 5/2012 | Mendoza et al. | |
| 8,572,985 B2 | | 11/2013 | Waddleton | |
| 9,483,061 B2 | * | 11/2016 | Simpson ................ | B64D 13/04 |
| 2003/0192595 A1 | * | 10/2003 | Benson ................... | G01F 1/363 137/488 |
| 2004/0186630 A1 | * | 9/2004 | Shier .................. | G05D 16/2053 700/301 |

(Continued)

FOREIGN PATENT DOCUMENTS

| | | | | |
|---|---|---|---|---|
| EP | 3045792 A1 | * | 7/2016 | ............... F02C 6/08 |
| GB | 1156017 A | | 6/1969 | |
| GB | 1191176 A | * | 5/1970 | ............ B64D 13/04 |

*Primary Examiner* — Jessica Cahill
(74) *Attorney, Agent, or Firm* — General Electric Company; William Scott Andes (57) ABSTRACT

Provided is a valve assembly system including a flowbody including a channel formed at an inner surface thereof, a butterfly plate disposed within the channel and rotatably mounted within the flowbody. The system also includes a pair of dual-sided pistons that receive differential pressure at an input side and an output side of the valve assembly system. A spring is controlled for biasing against at least one of the dual-sided pistons based on the differential pressure, and to rotate the butterfly plate to regulate the differential pressure and the valve assembly system to a predetermined output pressure.

17 Claims, 8 Drawing Sheets (56) References Cited

U.S. PATENT DOCUMENTS

| | | | | |
|---|---|---|---|---|
| 2008/0000531 A1* | 1/2008 | Robb | ............... | G05D 16/166 |
| | | | | 137/488 |
| 2009/0261279 A1* | 10/2009 | Tanner | ............... | F16K 1/221 |
| | | | | 251/62 |
| 2012/0199211 A1* | 8/2012 | Schroder | ............ | F01D 17/24 |
| | | | | 137/14 |
| 2014/0150902 A1* | 6/2014 | Pirat | ............... | F16K 31/1245 |
| | | | | 137/487.5 |
| 2014/0366965 A1* | 12/2014 | Simpson | ............ | B64D 13/04 |
| | | | | 137/500 |
| 2016/0186885 A1* | 6/2016 | LaVallee, III | ...... | F16K 31/1223 |
| | | | | 251/26 |

* cited by examiner

DIFFERENTIAL PRESSURE REGULATING SHUT-OFF VALVE

I. TECHNICAL FIELD

The present invention relates generally to valve assembly systems. In particular, the present invention relates to shut-off valve assemblies regulated by differential pressure.

II. BACKGROUND

Valves are commonly used in applications where the passage of fluid or air through pipes or docs must be controlled. In the aviation industry, for example, valves are typically used to control air distribution and direct air flow in systems used in jet engines.

In a jet engine system, for example, a valve assembly system can include air-actuated valves to control the flow of bleed air for anti-icing applications. These air-actuated valves typically monitor the output pressure and provide control feedback using a servo control to thereby provide differential pressure (DP) control. In the current system, the differential pressure is reduced by a reference regulator.

Valve designs, however, are becoming increasingly complex. These more complex designs often include additional components that are larger, heavier, and often less reliable. The additional components (e.g., the servo controller and the reference regulator), especially when used in applications such as a feedback control loops to control system internal pressure, can add undesirable weight to the system. Additionally, these complex components are a common source of failure in air-actuated valves, thus reducing overall system reliability. Weight, size, and reliability are well-known hurdles in the aviation industry.

III. SUMMARY OF THE EMBODIMENTS

Given the aforementioned deficiencies, a need exists to increase the reliability of air operated valves. Embodiments of the present invention provide a valve assembly system that operates based on differential pressure control without the use of additional components and feedback loop control. That is, the valve assembly system of the present invention solely operates based on the differential pressure between the upstream and downstream pressure sides of a valve thereof.

In one exemplary embodiment, a valve assembly system is provided. The valve assembly system includes a flowbody including a channel formed at an inner surface thereof, a butterfly plate disposed within the channel and rotatably mounted within the flowbody. A pair of dual-sided pistons receive differential pressure at an input side and an output side of the valve assembly system. The system also includes a spring controlled for biasing against at least one of the dual-sided pistons based on the differential pressure, and to rotate the butterfly plate to regulate the differential pressure and the valve assembly system to a predetermined output pressure.

In another exemplary embodiment, the valve assembly system includes a single dual-sided piston. The rotation of the butterfly plate is based upon a force balance between the differential pressure received at the dual-sided piston and a force of the spring, to thereby regulate the differential pressure.

The foregoing has broadly outlined some of the aspects and features of various embodiments, which should be construed to be merely illustrative of various potential applications of the disclosure. Other beneficial results can be obtained by applying the disclosed information in a different manner or by combining various aspects of the disclosed embodiments. Accordingly, other aspects and a more comprehensive understanding may be obtained by referring to the detailed description of the exemplary embodiments taken in conjunction with the accompanying drawings, in addition to the scope defined by the claims.

The drawings are only for purposes of illustrating preferred embodiments and are not to be construed as limiting the disclosure. Given the following enabling description of the drawings, the novel aspects of the present disclosure should become evident to a person of ordinary skill in the art. This detailed description uses numerical and letter designations to refer to features in the drawings. Like or similar designations in the drawings and description have been used to refer to like or similar parts of embodiments of the invention.

V. DETAILED DESCRIPTION OF THE EMBODIMENTS

As required, detailed embodiments are disclosed herein. It must be understood that the disclosed embodiments are merely exemplary of various and alternative forms. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Embodiments of the present invention provide a valve assembly system that can be used to control differential pressure and provide a predetermined output (set-point) pressure to control the flow of bleed air in jet engine systems, for example, for anti-icing applications. The valve assembly system of the present invention can be implemented within other systems and applications as desired. The present invention can also be implemented within other aircraft applications such as aircraft cabin pressure control.

Details regarding the valve assembly system, in accordance with various embodiments of the present invention, will now be discussed with reference to FIGS. 1-8.

Figure 1:
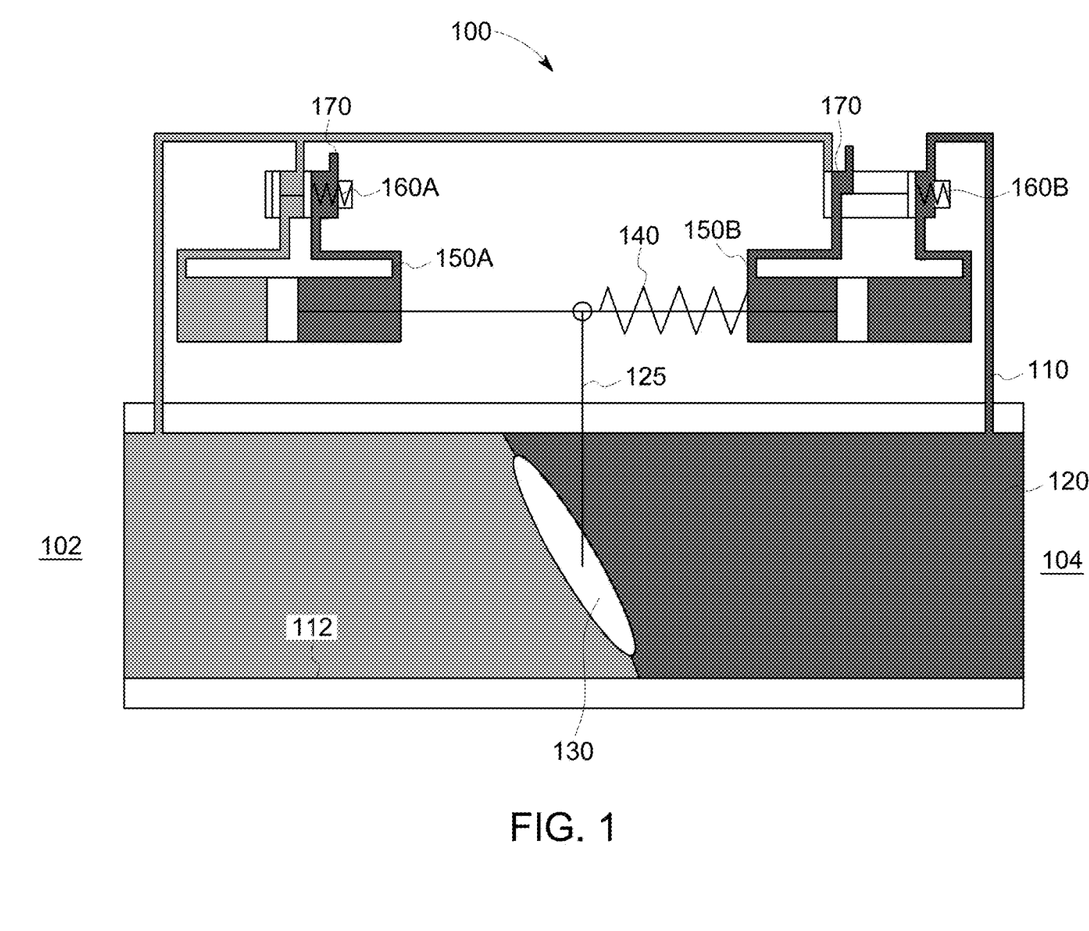
FIG. 1 illustrates an example of a valve assembly system having a pair of dual-sided pistons operating in a regulating mode that can be implemented within one or more embodiments of the present invention.

FIG. 1 illustrates a valve assembly system 100 including a flowbody 110, a channel 120, a shaft 125, a butterfly plate 130, a spring 140, and a pair of dual-sided pistons 150a and 150b. The flowbody 110 includes the channel 120 formed within an inner surface 112, thereof. The flowbody 110 can be formed of metallic material e.g., titanium. However, the present invention is not limited hereto and any suitable material may be used. For example, stainless steel and Inconel can be used depending upon the temperature requirements. Further, although one channel 120 is illustrated, the present invention is not so limited and may include a set of channels 120 as needed.

The butterfly plate 130 is disposed within the channel 120 and rotationally mounted thereto via a rotating means connected to the shaft 125. The butterfly plate 130 is rotated based on the actuation of the spring 140 in connection with the shaft 125. The butterfly plate 130 can be formed from a variety of stainless steels and inconel depending upon the temperature requirements, or any other suitable type of material. The spring 140 can be any type of mechanism capable of being actuated to cause the rotation of the butterfly plate 130. The spring 140 is actuated based on the differential pressure received at the pair of dual-sided pistons 150a and 150b. According to embodiments of the present invention, the spring 140 is a 3-stage spring that includes three different spring constants. The spring 140 acts to extend the range of regulation on both ends of the butterfly plate 130.

The dual-sided pistons 150a and 150b use the differential pressure to act against the spring 140 to selectively close or open the butterfly plate 130 via the shaft 125 based on the amount of differential pressure applied. The dual-sided pistons 150a and 150b can be spool-valve powered. Therefore, a spool valve 160a and 160b or similar valve can receive power to control the command open and closed functions of the valve assembly system 100. The spool valve 160a and 160b are connected with the respective pistons 150a and 150b at an input and output thereof.

Details regarding the various operations (i.e., regulating, command open and close functions) of the valve assembly system 100 will now be discussed with reference to FIGS. 1-3.

As further depicted in FIG. 1, and by way of example, the valve assembly system 100 is operating in a regulating mode. The pistons 150a and 150b receive input pressure via the spool valves 160a and 160b and regulate the input pressure to a predetermined output pressure. The output pressure can be approximately 75 pounds per square in gauge (psig). The input pressure can be approximately 250 psig. This yields a differential pressure across the butterfly of 175 psig. The input pressure can vary from near zero to 350 psig or higher over the course of a flight.

In FIG. 1, the pressure at the input side 102 and output side 104 of the valve assembly 100 transfers directly to the respective sides of the pistons 150a and 150b and balances against the spring 140. The spring 140 biases the valve assembly system in an open or closed position. For a differential pressure valve, the spring must bias the unit open. A stop must be set such that the butterfly cannot achieve a full open status as the valve requires a differential pressure to operate. Exposure to atmospheric airflow 170 in the spool valves 160a and 160b at the pistons 150a and 150b further assists in regulation of the output pressure to the input pressure.

Figure 2:
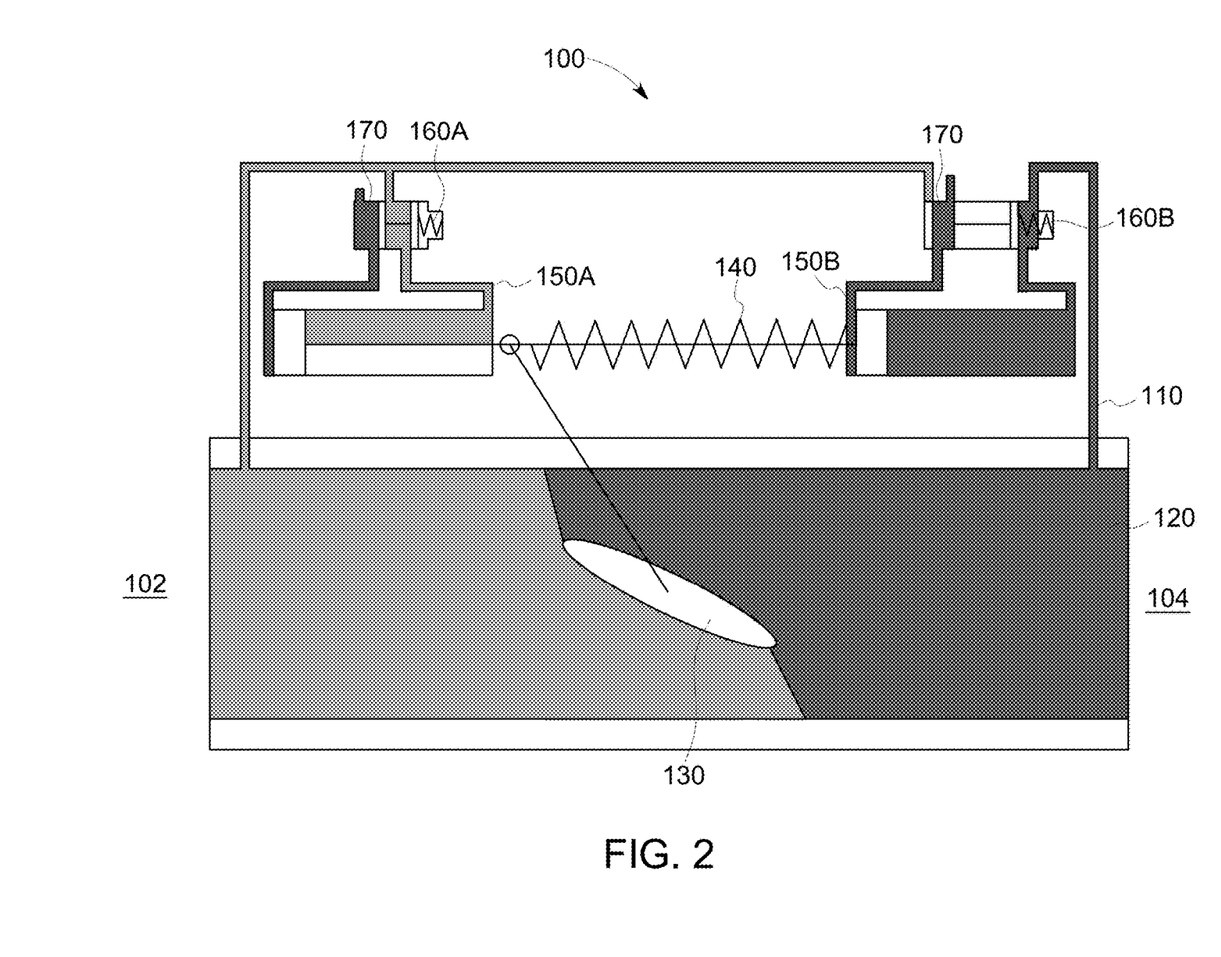
FIG. 2 illustrates the valve assembly system of FIG. 1 operating in a command open function that can be implemented within one or more embodiments.

In FIG. 2, the input pressure at the input side 102 is higher than the output pressure at the output side 104, the differential pressure across the pistons 150a and 150b is reduced thereby causing the spring 140 to be released and the butterfly plate 130 to rotate to an open position, in order to regulate the output pressure to a predetermined output pressure.

Figure 3:
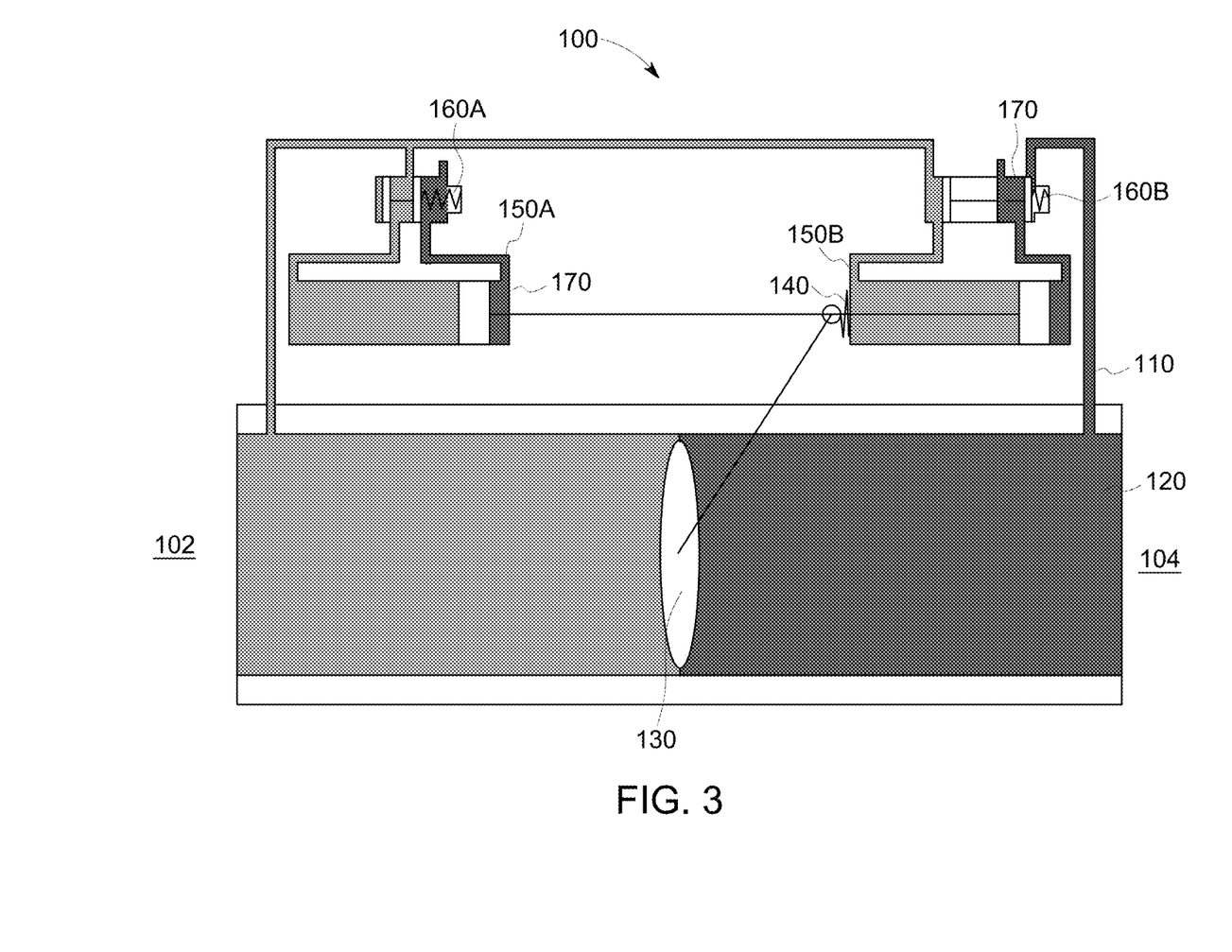
FIG. 3 illustrates the valve assembly system of FIG. 1 operating in a command closed function that can be implemented within one or more embodiments of the present invention.

In FIG. 3, the input pressure at the input side 102 is greater than the output pressure at the output side 104. Therefore, the differential pressure is increased and the spring 140 is biased causing the butterfly plate 130 to rotate to a closed position. The airflow 170 is added to the output side of the pistons 150a and 150b to further assist in regulating the differential pressure to thereby regulate the output pressure.

The present invention is not limited to including a pair of dual-sided pistons and may be implemented using a single dual-sided piston and an input or output side thereof.

Figure 4:
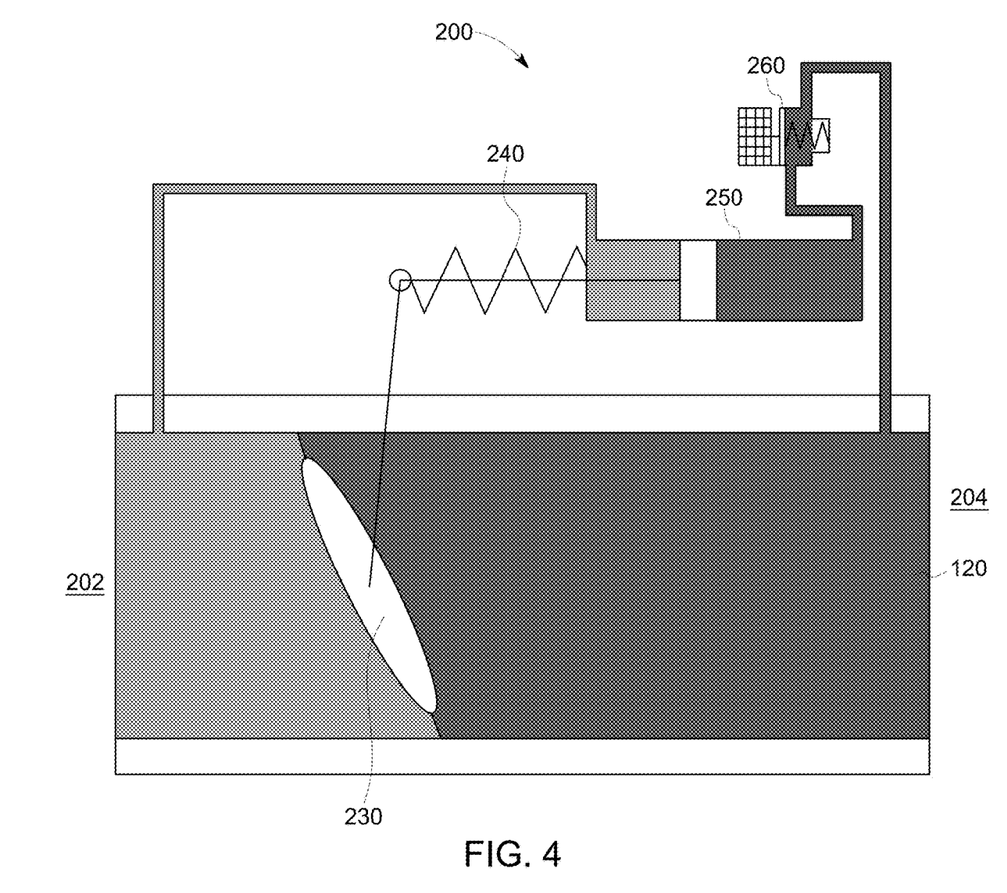
FIG. 4 illustrates a valve assembly system having a single dual-sided piston (without a command open function) and operating in regulating mode that can be implemented within one or more alternative embodiments of the present invention.
Figure 5:
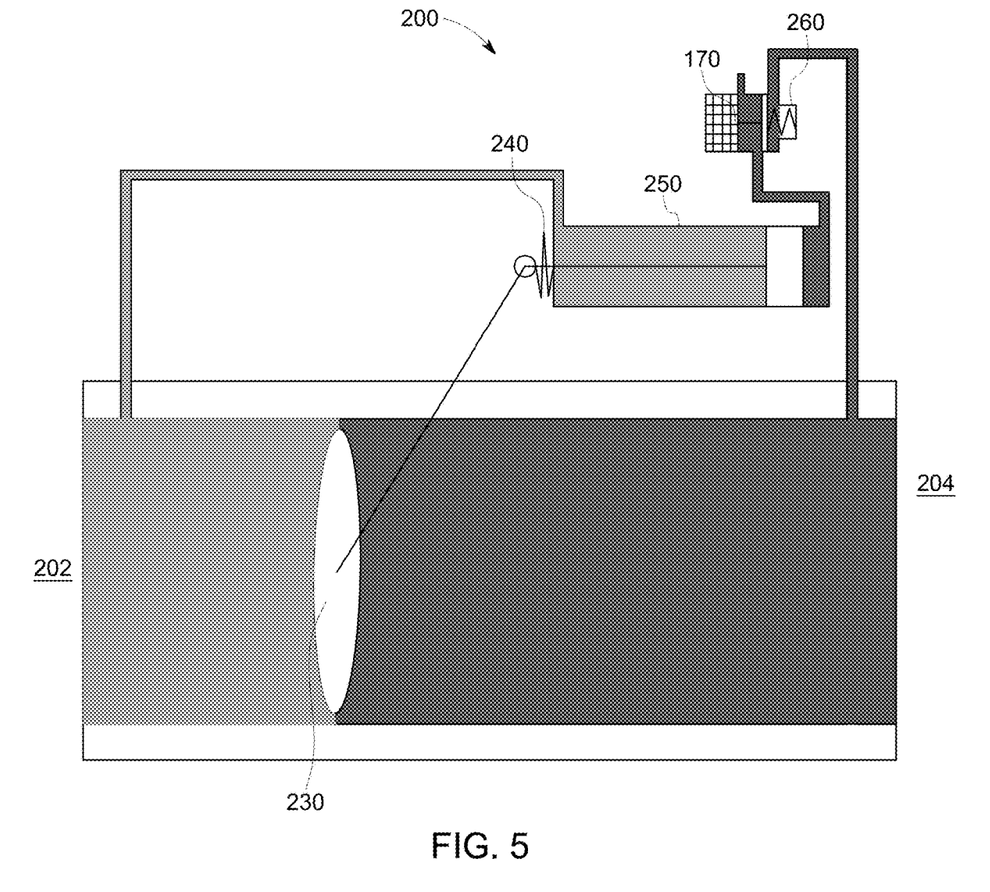
FIG. 5 illustrates the valve assembly system of FIG. 4 operating in a command closed function that can be implemented within one or more embodiments of the present invention.

As shown in FIGS. 4 and 5, a valve assembly system 200 is provided. The system 200 includes similar components as the system 100 shown in FIGS. 1-3. The system 200, however, only includes a single dual-side piston 250 at an output side 204 instead of a pair of pistons. Therefore it does not include a command open function. Accordingly, a detailed description of each of the components is omitted.

In FIG. 4, an input pressure at an input side 202 and an output pressure at an output side 204 are regulated by the actuation of the spring 240. This actuation is based on the input pressure being received at the input side of the piston 250 and the output pressure being received at the outlet side of the piston via the spool valve 260. Therefore, based on the actuation of a spring 340, a butterfly plate 330 is rotated to be partially open to regulate the differential pressure and thereby regulate the output pressure.

In FIG. 5, the valve assembly system 200 is operated in a command closed function. In this embodiment, the input pressure is higher than the output pressure, and the spring 240 force is exceeded at the piston 250 to rotate the butterfly plate 230 to a fully closed position. Airflow 170 is vented to atmosphere on the backside of the piston 250 to further assist closing. In FIGS. 4 and 5, the valve is normally open as it is biased open by the spring 240. The addition of the command open function provides a maximum flow or minimizes the pressure drop across the valve.

Figure 6:
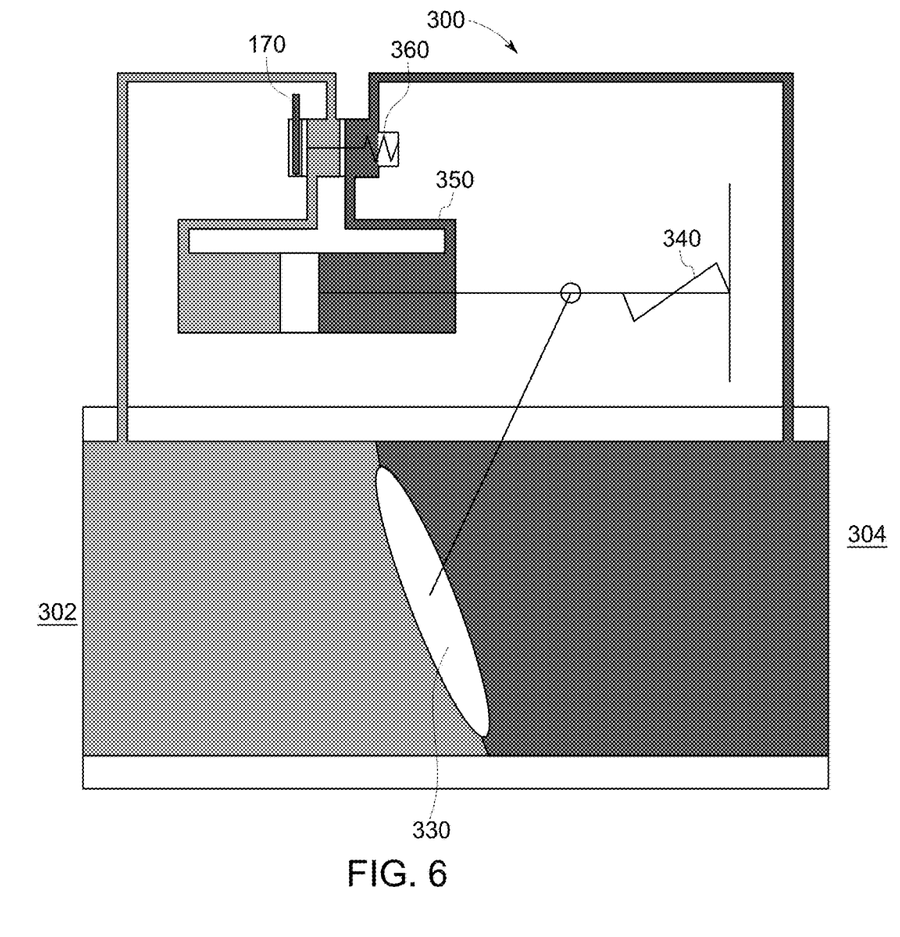
FIG. 6 illustrates a valve assembly system having a single dual-sided piston (without a command closed function) and operating in a regulating mode that can be implemented within one or more embodiments of the present invention.
Figure 7:
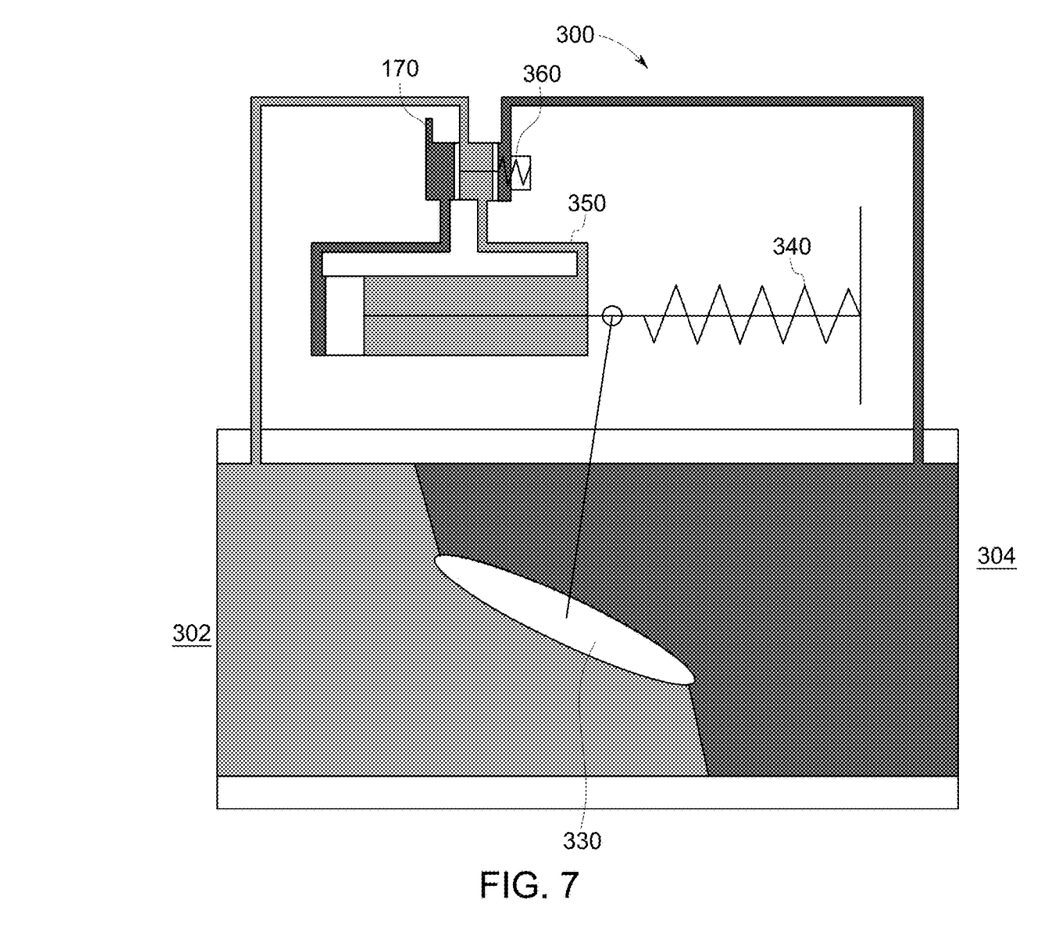
FIG. 7 illustrates the valve assembly system of FIG. 6 operating in a command open function that can be implemented within one or more embodiments of the present invention.

FIGS. 6 and 7 illustrate a valve assembly system 300 according to another embodiment of the present invention. In this embodiment, the command closed function is removed. The valve assembly system 300 is similar to the valve assembly system 200 shown in FIGS. 4 and 5. The system 300, however, only includes a single dual-sided piston 350 at an input side 302.

In FIG. 6, the output pressure at the output side 304 is regulated by biasing the spring 340 in a partially open position and adding a minimal amount of airflow 170 to a spool valve 360 at the input side of the piston 350. As shown in FIG. 6, the system 300 is in regulation mode. The spool valve 360 is unpowered. If a change in the upstream pressure or in the downstream restriction occurs, the pressure in the pistons 350 would equalize to the pressures on the two sides of the butterfly plate 330. At that point there would be a minimal amount of airflow 170. The flow rate is dependent upon the size of the pipes and restrictions and the rate of change of the pressures in the spool valve 360.

In FIG. 7, the valve assembly system 300 operates in a command open function. In this embodiment, the input pressure at the input side 302 is greater than the output pressure at the output side 304, the spring 340 is released and the butterfly plate 330 is open. Airflow 170 is vented to atmosphere at the input side of the piston 350 to assist with opening. As show in FIGS. 6 and 7, in a command open function, not including a command closed function, the spool valve 360 is intended to regulate the in line pressure in a system 300. A command closed function would shut the flow off. According to some embodiments, if the system 300 does not require that the flow be shut off, then a command closed function is unnecessary.

Figure 8:
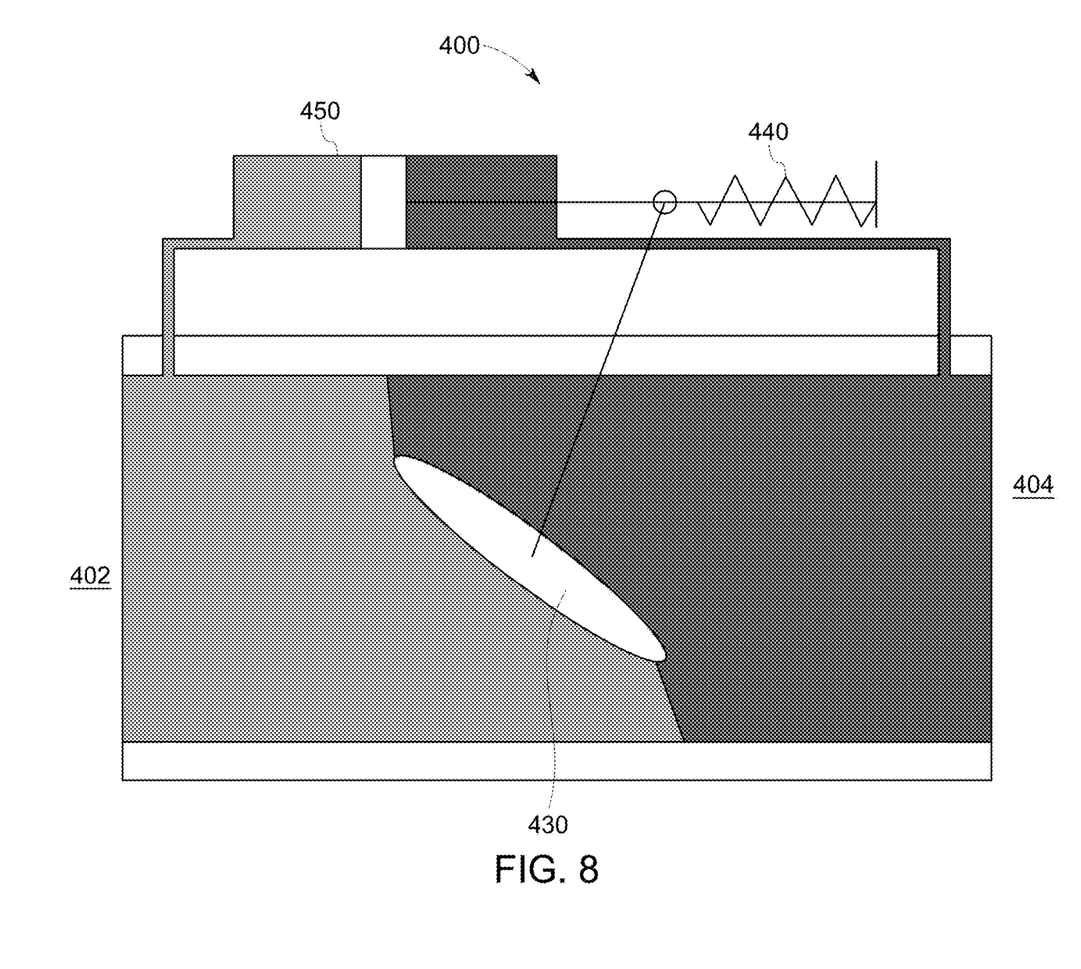
FIG. 8 illustrates a valve assembly system operating in a regulating mode without command open or command closed functions that can be implemented within alternative embodiments of the present invention.

FIG. 8 illustrates a valve assembly system 400 including an input side 402 and an output side 404 according to an alternative embodiment of the present invention. In FIG. 8, the system 400 includes a single dual-sided piston 450 and excludes a spool valve for receiving power to control the differential pressure across the piston 450. The rotation of a butterfly plate 430 is determined based on the force balance between the differential pressure at the piston 450 and the force of a spring 440. As shown, when in regulating mode, the differential pressure in the piston 450 equals the differential pressure across the butterfly plate 430.

Embodiments of the present invention provides the advantages of regulating output pressure without the use of additional components and a feedback loop control. Embodiments of the present invention further provide the advantages of reduced weight and size whereby weight is further reduced by the removal of the reference regulator that is used in typical systems to limit the pressure that is seen by the valves operating system. Since the valve of embodiments of the present invention, uses the full differential pressure available, the size of the components (e.g., pistons and associated hardware) can be further reduced, further reducing the weight. Further, reliability is improved by removing components that are common failure points.

This written description uses examples to disclose the invention including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:
1. A valve assembly system comprising:
a flowbody including a channel formed at an inner surface thereof;
a butterfly plate disposed within the channel and rotatably mounted within the flowbody;
a pair of dual-sided pistons, each piston configured to receive differential pressure from an input side and an output side of the valve assembly system at respective ends of each piston;
a spring controlled for biasing against at least one of the dual-sided pistons responsive to the differential pressure, wherein the spring is configured to rotate the butterfly plate to regulate the differential pressure and the valve assembly system to a predetermined output pressure; and
a shaft connected to the butterfly plate and between the pair of dual-sided pistons, wherein the spring is mounted to the shaft.

2. The valve assembly system of claim 1, further comprising a valve connected at an input and output side of each dual-sided piston and configured to receive input pressure and to regulate the differential pressure received at each dual-sided piston.

3. The valve assembly system of claim 2, wherein the valve comprises a spool-type valve.

4. The valve assembly system of claim 1, wherein input pressure and output pressure are transferred directly to respective sides of each dual-sided piston and balance against the spring.

5. The valve assembly system of claim 4, wherein when the input pressure is less than the output pressure, the differential pressure across each dual-sided piston decreases and the spring is released and the butterfly plate rotates to an open position, to regulate the output pressure.

6. The valve assembly system of claim 5, wherein atmospheric airflow is input to an input side of each dual-sided piston to regulate the differential pressure.

7. The valve assembly system of claim 4, wherein when the input pressure is greater than the output pressure, the differential pressure across each dual-sided piston increases and the spring is biased to cause the butterfly plate to rotate to a closed position.

8. The valve assembly system of claim 7, wherein atmospheric air flow is input to an output side of each dual-sided piston to regulate the differential pressure.

9. A valve assembly system comprising:
a flowbody including a channel formed at an inner surface thereof;
a butterfly plate disposed within the channel and rotatably mounted within the flowbody;
a single dual-sided piston disposed at an output side or an input side of the valve assembly system, and configured to receive differential pressure from the input side and the output side of the valve assembly system at respective ends of the single dual-sided piston;
a spring controlled to be biased against at the dual-sided piston based on the differential pressure, wherein the spring is configured to rotate the butterfly plate to regulate the differential pressure and the valve assembly system to a predetermined output pressure; and
a shaft connected to the butterfly plate and the single dual-sided piston, wherein the spring is mounted to the shaft.

10. The valve assembly system of claim 9, wherein when the dual-sided piston is at the output side of the valve assembly system, the input pressure and output pressure are regulated by actuation of the spring based on the input pressure and the output pressure wherein the butterfly plate is partially open to regulate the differential pressure.

11. The valve assembly system of claim 10, wherein when the input pressure is higher than the output pressure, the spring is biased at the dual-sided piston to rotate the butterfly plate to a fully closed position.

12. The valve assembly system of claim 11, wherein atmospheric airflow is vented at the output side of the dual-sided piston to regulate the differential pressure.

13. The valve assembly system of claim 9, wherein when the dual-sided piston is disposed at the input side of the valve assembly system, the output pressure is regulated by biasing the spring to rotate the butterfly plate to a partially open position, and receiving atmospheric airflow to the input side of the dual-sided piston.

14. The valve assembly system of claim 13, wherein when the input pressure is greater than the output pressure, the spring is released and the butterfly plate is fully open to regulate the differential pressure.

15. The valve assembly system of claim 14, wherein atmospheric airflow is receives at the input side of the dual-sided piston to regulate the differential pressure.

16. A valve assembly system comprising:
 a flowbody including a channel formed at an inner surface thereof;
 a butterfly plate disposed within the channel and rotatably mounted within the flowbody;
 a single dual-sided piston configured to receive differential pressure from an input side and an output side of the valve assembly system at respective ends of the single dual-sided piston;
 a spring configured to be biased against the dual-sided piston, to control a rotation of the butterfly plate, wherein the rotation of the butterfly plate is based upon a force balance between the differential pressure received at the dual-sided piston and a force of the spring, to thereby regulate the differential pressure; and
 a shaft connected to the butterfly plate and the single dual-sided piston, wherein the spring is mounted to the shaft.

17. The valve assembly system of claim 16, wherein when in regulating mode, the differential pressure in the dual-sided piston equals the differential pressure across the butterfly plate.

\* \* \* \* \*